Aug. 10, 1971 LE ROI NOTTOLI Re. 27,166
SELECTIVE CARD DISTRIBUTING DEVICE
Original Filed Oct. 15, 1965
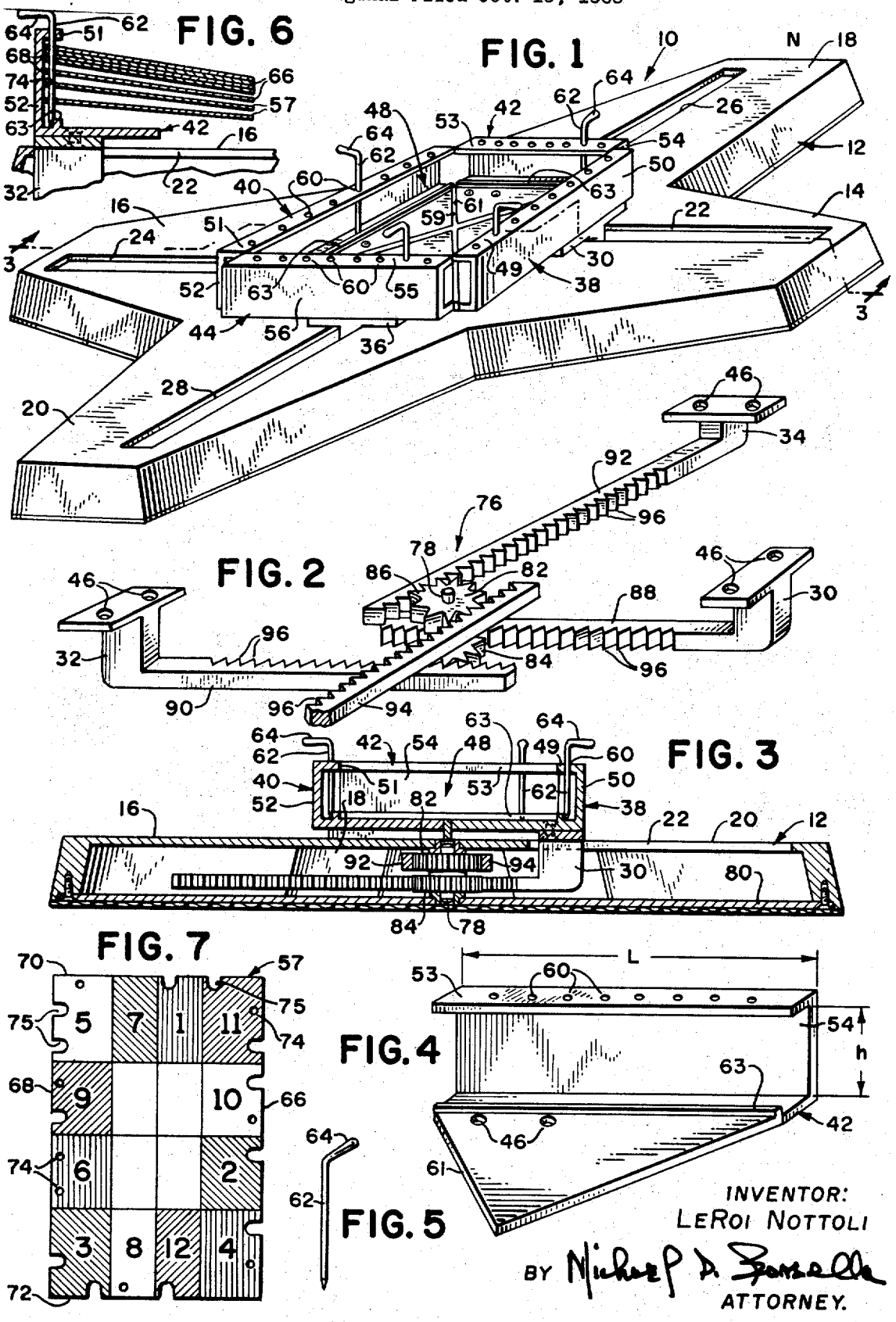
INVENTOR:
LEROI NOTTOLI
BY Michael P. A. Fasciale
ATTORNEY.

United States Patent Office

Re. 27,166
Reissued Aug. 10, 1971

27,166
SELECTIVE CARD DISTRIBUTING DEVICE

Le Roi Nottoli, Chicago, Ill., assignor to Robert H. Hallowell Industries, Inc.

Original No. 3,377,070, dated Apr. 9, 1968, Ser. No. 496,618, Oct. 15, 1965. Application for reissue Oct. 13, 1969, Ser. No. 871,486
Int. Cl. A63f *1/14*
U.S. Cl. 273—149P 16 Claims

Matter enclosed in heavy brackets [ ] appears in the original patent but forms no part of this reissue specification; matter printed in italics indicates the additions made by reissue.

ABSTRACT OF THE DISCLOSURE

Cards containing predetermined information may be simply and easily separated by placing holes and cutouts along the edges of the cards to be used and utilizing as the means for separation a device comprising a base and a plurality of card carrying trays which are movable on the base, said trays having holes therethrough so that a pin or series of pins which are adapted to be removably placed through a hole in each of said trays will pass through a preselected series of holes and cutouts and movement of the trays outward will result in extraction of certain cards in one or more directions thereby effecting separation. The cards and device described herein are especially suitable for use with playing cards whereby a pack of playing cards having the holes and cutouts above described may be separated into four preselected hands.

*This application relates to an invention disclosed and claimed in my copending application Ser. No. 411,256, filed Nov. 16, 1964, now Patent No. 3,377,069, issued Apr. 9, 1968.*

The present invention relates to card dealing devices and more particularly to a type adopted to separate and distribute a plurality of preselected hands of playing cards from a special deck, simultaneously in different directions.

However the utility of the invention is not necessarily limited to use in conjunction with playing cards, although applications of it will be great in the field. It will be evident that the invention may be advantageously practiced in any situation where it is desired to separate and distribute certain preselected cards (not necessarily playing cards) simultaneously in four different directions, provided the cards are manufactured with certain slots and holes therein as hereinafter described.

The invention has particular utility in teaching various card games, wherein the instructor desires to deal each pupil certain specific playing cards during the course of a lesson to better illustrate the accompanying verbal explanations. The herein disclosed device is capable of selectively dealing one single card or a greater number according to the teaching requirements.

Heretofore in the art various types of card selecting or card separating devices have been employed. But generally these have related to improvements in filing systems and the novelty, if any, resided in the ability of the apparatus to select certain record cards from a number filed in a container or cabinet. Other prior art devices deal with improvements in the actual filing and physical arrangement of record cards to facilitate office procedures.

The present invention contemplates providing a novel card dealing device operable in conjunction with a deck of special playing cards, or other data containing cards, having certain aligned slots and holes along the edges thereof as hereinafter more fully explained. The deck or pile of cards is placed in the center of the device whereas it is completely confined and contained by four outwardly movable panels and automatically aligned into a neat pile. A plurality of holes are disposed in each panel along the periphery of the pile and are adapted to receive a pin therethrough. The pins extend through the holes in the panels and pick up linearly matching holes in the cards to provide the force necessary to pull certain preselected cards along with their respective movable panels, simultaneously in four different directions.

It is therefore one of the objects of the present invention to provide a novel card dealing device capable of dealing a preselected desired hand to each of four players.

A further object is to provide a card dealing device of the above indicated nature which will automatically align the deck placed therein.

Still another object of the invention is to provide apparatus of the above indicated nature employing a plurality of pins to selectively separate and deal playing hands from the deck.

Another object of the invention is to provide novel apparatus of the above indicated nature which shall be relatively simple and inexpensive to manufacture, yet positive and reliable in use.

Further objects and advantages and features will appear more fully hereinafter from a consideration of the detailed description which follows, taken together with the accompanying drawing wherein one embodiment of the invention is illustrated by way of example. It is to be expressly understood however, that the drawing is for the purposes of illustration only, and is not to be construed as defining the limits of the invention, reference being had for this purpose to the appended claims.

In the drawing wherein like reference characters indicate like parts:

FIG. 1 is an isometric view of the complete card separator assembly, including the arrangement of holes and pins therein.

FIG. 2 is an isometric view showing the moving mechanism of the device.

FIG. 3 is a sectional view taken along the line 3—3 of FIG. 1 looking in the direction of the arrows.

FIG. 4 is an isometric view of a card carrying tray comprising an element of the card separator.

FIG. 5 is a perspective view of a selecting pin adapted to mate into the holes shown in FIGS. 1 and 4.

FIG. 6 is an operational representation of a tray of FIG. 1 showing a pin of FIG. 5 installed in a movable panel to engage a plurality of cards.

FIG. 7 is a plan view of the back of a special playing card employed in conjunction with the card separator.

Referring now to the drawing and more particularly to FIG. 1 there is shown a selective card separator and distributor generally designated by the numeral 10 comprising a substantially hollow cruciform base 12, defined by platforms or arms 14, 16, 18 and 20 forming the four arms of the cruciform base 12.

Thus the platforms 14 and 16 are colinear and at substantially right angle to like colinear platforms 18 and 20. Each of the platforms or arms 14, 16, 18 and 20 contain therein, through slots 22, 24, 26 and 28 respectively of specified lengths as later explained, and within each slot rides a tray carrier designated in FIGS. 1 and 2, as 30, 32, 34 and 36. The carriers 30, 32, 34 and 36 bear card trays 38, 40, 42 and 44 respectively attached thereto in any approved manner such as through mounting holes 46 (FIGS. 2 and 4). Thus the card trays 38, 40, 42 and 44 ride outwardly and inwardly above the base 12 for the length of the slots 14, 16, 18 and 20 and it will be noted that at the most inward position of the trays, a rectangular enclosure 48 is formed, defined (FIG. 1) by four vertical inverted L-shaped walls 50, 52, 54 and 56 forming the back of the trays 38, 40, 42 and 44 respectively. The enclosure 48 is the exact size as and adapted to contain one or more special playing cards 57 (FIG. 7) or other cards of like size, not shown here, and since the height "h" (FIG. 4) of the walls 50, 52, 54 and 56 is the same or slightly greater than the thickness of an entire deck 58 (not shown here) of special cards 57, it will be readily evident that when such a deck 58 is placed within the enclosure 48, and the card trays 40, 42, 44 and 46 are positioned slightly outward; upon moving the trays to their innermost position, so that edges 59, and 61 of card trays 40 and 42 for example (FIGS. 1 and 4) meet and bear against a crossrib 55, on the base 12, the deck 58 will find itself automatically and neatly stacked and aligned.

Referring now to FIGURES 1 and 4 it will be noted that the inverted L-shaped walls 50, 52, 54, and 56 comprise overhanging arms 49, 51, 53 and 55. Each overhanging arm contains a plurality of identical through holes 60 extending linearly along the entire length L thereof, spaced and positioned approximately equidistantly along each arm; eight such holes being shown here (FIG. 4) by way of example.

Each hole 60 is adapted to snugly receive a pin 62 therethrough as shown in FIG. 1. The pins 62 are preferably circular in diameter and embody a substantially horizontal arm 64 to facilitate insertion or removal of the pins from the holes.

Special playing cards

Referring now to FIG. 7 wherein details of the special playing card 57 are disclosed, it will be seen that the four edges 66, 68, 70 and 72 thereof contain a plurality of holes 74 and cutouts or slots 75 disposed along the length thereof at substantially equispaced locations.

The holes 74, and slots 75 are spaced and positioned along the edges 66, 68, 70 and 72 of the playing cards 57 which form the special deck 58, in such a manner that their position wherever they are present, in any given card, is identical and matching with the spacing and positioning of the holes 60 in the arms 49, 51, 53 and 55 of their respective walls 50, 52, 54 and 56. More simply stated; the various cards 57 of which the deck 58 is composed, each contain one or more holes 74 or cutouts 75 along their four edges. The number of holes and cutouts and their positioning on any given card is dependent upon the particular playing combination or pre-arranged hand to which the card is assigned, and forms part of a carefully pre-conceived pattern not part of this invention. However, the holes 74 and cutouts 75 will always be made to fall exactly beneath a hole 60, and on a vertical line therewith.

Referring to FIGS. 1 and 6, it will be seen that the pin 62 extends downward vertically through one of the holes 60 in the arm 51 and through at least one hole 74 in the playing cards 57. Hence when the card tray 40 is made to move outwards, all of the playing cards 57 wherein the pin 62 passes through a hole 74 thereof will perforce be pulled outwards along with the card tray 40. All of these cards however wherein the pin 62 passes vertically through a cutout, or slot 75 thereof will not accompany the card tray 40 in its outwards movement. Since the holes 74 and slots or cutouts 75 in the cards are vertically superimposed, and all are vertically aligned with one of the holes 60 on the overhanging arms 49, 51, 53 and 55, it is evident that by a planned positioning of the holes 74 and cutouts 75 on certain cards to fall in vertical alignment with a selected hole 60, it is possible to cause a desired card or combination of cards to be pulled out of the deck by placing a pin in a pre-arranged hole 60. The same pin placed in an adjacent hole 60 for example, will cause a different combination of cards to be pulled from the deck. And it will further be evident that by positioning a pin 62 in each overhanging arm 49, 51, 53 and 55, when the trays 40, 42, 44 and 46 are in their most inward position (so that edges 59 and 61 meet the cross-rib 55) and the deck 58 is neatly stacked, four different prearranged combinations of cards may be drawn from the deck simultaneously. *The holes and cutouts thus serve as coding means along the edges of the cards, and the overhanging arms and holes 60 comprise card selector means for cooperation with the coding means to separate particular cards from the deck in a plurality of different directions.*

If cards other than playing cards are being employed in conjunction with the separator 10, as heretofore stated, the holes 74 and the slots 75 will be positioned in the cards in like manner, so as to always fall directly and vertically below a hole 60 when the pile of cards is neatly stacked and aligned in the separator.

The playing cards 57, have, in addition, an identifying design on the back. For example the card 57 (FIG. 7) shows a back divided into 16 rectangles. Each rectangle is one of four different colors, as for example, white, red, green and brown. Each rectangle has a numeral imprinted thereon ranging from 1 to 13, since there are 13 cards to each of the four conventional suits. The corresponding rectangle on each of the cards 57 is the same color although the numeral thereon may be different. For example, the card 57 (FIG. 7) shows the upper left hand rectangle to be white, and bearing the numeral 5. Thus, on all the cards of the deck 58, the upper left hand rectangle is white, but the numerals thereon will range from 1 to 13 for each of the four suits. These numerals indicate the correct order of play of each bridge hand dealt out by the distributor 10. In this manner, by following the proper number in any given rectangle of the same color, and in the same position on each card, the cards will be played in the correct predetermined order according to the instruction technique. It is also possible for a student player, after he has selected and played a card to turn it over and observe whether he has made the correct selection according to the standards of the instructor. It will be noted that the number of hands possible to play in predetermined order may be increased by employing 32 rectangles instead of 16 on the back of the cards, each rectangle bearing a numeral assigned to a specific card, ranging from 1 to 13.

A retaining rib 63 keeps the pin 62 stable when engaging cards 57.

Moving mechanism

Referring now to FIGURES 2 and 3, there is shown in its preferred embodiment, a moving mechanism 76 contained within the cruciform base 12 of the distributor 10. Other arrangements may occur to those skilled in the art.

The moving mechanism 76 comprises a vertically disposed shaft 78 attached to the top and bottom of the hollow base 12 in any prescribed manner (not shown here) that permits the shaft to rotate freely in either a clockwise or counterclockwise direction. A removable bottom plate 80 provides servicing access to the mechanism 76. Attached to the shaft 78 and concentrically integral therewith are a pair of identical ratchet wheels 82 and 84, designated as upper ratchet wheel and lower ratchet wheel respectively, having teeth 86 about the external periphery thereof. The tray carriers heretofore mentioned, 30, 32, 34 and 36 are integral with and embody gear rods 88, 90, 92 and 94 respectively, having gear teeth 96 adapted to mate with the teeth 86 on the ratchet wheels, and are snugly mated therewith by the snug position of the tray carriers within their respective slots 22, 24, 26 and 28, so that the gear rods 88 and 90 mate with diametrically opposite sides of the lower ratchet wheel 84 and travel parallel to one another, while the rods 92 and 94 mate at diametrically opposite points with the upper ratchet wheel 82 and travel in like manner.

Thus it will be evident that any reciprocating linear motion imparted to any one of the gear rods 88, 90, 92 and 94 will be translated into rotary motion of the ratchet wheels 82 and 84 and thereby retranslated into like reciprocating linear motion in the remaining three gear rods. Thus the tray carriers and their respective trays, 38, 40, 42 and 44 will all move simultaneously a like distance either inward towards the center, or outward along the arms of the cruciform base 12.

Operation

Having thus described the invention, it will now be apparent to those versed in the art that in operation of the novel distributor 10, when a deck 58 consisting of the special cards 57 is placed within the enclosure 48, or any other cards of like size, are placed therein, movement inward of the card trays 30, 32, 34 and 36 to their innermost position will automatically stack and align the deck, because the enclosure 48 defined by the vertical walls 50, 52, 54 and 56 is the exact size of the deck 58.

At this point, a pin 62 is placed through each of the four overhanging arms 49, 51, 53 and 55 in a pre-selected hole 60 in each arm. The selection of the holes will depend upon the particular hands or combinations of cards it is desired to draw from the deck, since as aforestated each hole represents a different card combination. Thus an instructor for example while teaching may arrange to have certain hands dealt from the deck which will better illustrate the substance of his lesson.

The pins 62 embody an arm 64 to facilitate manipulation of the pins, and the transfer thereof between the various holes 60.

Upon manually moving any card tray along its slot outward towards the arms of the cruciform base 12, all of the card trays will move outward simultaneously a like amount and carry along with them four chosen playing hands attached to the four pins 62. As an illustration; if it is desired to deal North (designated by N. FIG. 1) the ace of clubs, the pin 62 in the vertical wall 54 will be placed in that particular hole 60 wherein it will pass through a corresponding hole 74 on the North edge of the ace of clubs. Hence the ace of clubs will be pulled out when the card tray 42 is pulled outward. Simultaneously other preselected cards, all having holes in vertical line with said hole on the ace of clubs will be extracted and distributed to the same player. And all of those cards having a slot or cutout 75 in vertical alignment with said hole will not be pulled out of the deck with the ace of clubs since the pin 62 will simply pass through the open cutout. The particular playing hands that will result from placing a pin in any given hole 60 are known to the instructor and selected accordingly. Stops, to prevent overriding of the tray carriers 30, 32, 34 and 36 are provided by the particular length of each slot 22, 24, 26 and 28 and a conventional snapcatch (not shown here) serves to maintain the tray carriers in contact with the crossrib 55, in the inwardmost position of the carriers.

While the invention has been illustrated and described with respect to a preferred embodiment thereof, it will be understood that it is intended to cover all such changes and modifications which do not constitute departures from the spirit of the invention and the scope of the claims.

What is claimed is:

[1. A card separating device comprising, a base, a plurality of card carrying trays having holes therethrough movable on said base, a plurality of cards having holes and cutouts selectively disposed about the edges thereof enclosed by said trays and adapted to be attached thereto, and a pin adapted to be removably placed through a hole in each tray and extending through the holes and cutouts in the cards to selectively extract certain of said cards in one or more directions.]

[2. A card separating device comprising, a plurality of card carrying trays having holes therethrough movable on said base and defining an enclosure adapted to receive a deck of playing cards having holes and cutouts selectively disposed about the edges thereof, said holes and cutouts being substantially vertically aligned, a pin adapted to be removably placed through a hole in each tray and extending through selected holes and cutouts in said cards to draw certain cards from the deck, said trays being movable outward to pull therewith the cards secured thereto by their respective pins.]

[3. The card separating device claimed in claim [2] wherein said enclosure is rectangular and the cards are moved simultaneously outward therefrom in a cruciform pattern.]

4. A card separating and hand dealing device comprising four arms disposed in cruciform fashion, a linear slot within each arm and a card carrying tray adapted to move inwardly and outwardly therein, an enclosure defined by said trays adapted to receive a deck of cards, each of which has a plurality of holes and cutouts selectively disposed along the edges thereof, said trays being adapted upon inward movement thereof to stack and align the deck, a pin selectively placed in each tray along the edge of the cards in alignment with selected ones of said holes and cutouts, said trays being movable outwardly along said slots to extract four hands of cards from the deck attached to said trays by the pins and distribute said hands simultaneously in four different directions.

5. The card separating and hand dealing device claimed in claim 4, wherein said card carrying trays each include a vertical wall having an overhang containing a plurality of holes therein for selectively placing the pins in each wall.

[6. In combination with a card separating device having a base and a plurality of card carrying trays having holes therethrough movable on said base and a removable pin associated with each of said trays, a plurality of cards having a plurality of holes and cutouts along the edges of said cards adapted to align with said holes in said trays so that disposing a pin through a selected hole in any tray attaches selected cards to the tray.]

[7. In combination with a card separating device having a base and a plurality of card carrying trays having holes therethrough movable on said base and at least one removable pin associated with each of said trays, a plurality of playing cards, each card having sequential playing indicia on the back thereof and a plurality of holes and cutouts along the edges of said cards adapted to align with the holes in the trays so that disposing pins through preselected holes in the trays attaches preselected combinations of cards to the movable trays.]

8. In a card selecting and extracting device, the combination comprising, a base including four arms disposed in cruciform fashion, a slot in each arm and a tray carrier reciprocably movable within each slot and card carrying tray mounted on each carrier, a vertical wall on each tray including an overhanging section having a plurality of linearly disposed holes therein, a vertical pin movably mounted in a hole in each overhanging section, said vertical walls defining a rectangular enclosure at the innermost position within the slots of the carriers, adapted to contain and align a deck of playing cards having a number of holes and cutouts along the edges thereof positioned vertically beneath the holes in the overhanging sections, said pins being adapted to be selectively positioned in the holes in each respective section above a preselected number of holes and cutouts in the cards to extract the playing cards bearing the preselected holes from the deck upon the outward movement of the carriers within the slots.

9. A card extracting device adapted to extract four groups of cards simultaneously from a deck and simultaneously distribute each group in a different direction, comprising a substantially hollow base having four arms arranged in cruciform fashion, a slot in each arm and a card carrying tray movable in each slot, a vertical wall on each tray adapted to define an enclosure the exact size of the deck upon moving the trays to the innermost position of the slots, an overhanging section integral with each vertical wall, a plurality of linearly disposed holes within said sections adapted to receive a vertical pin therethrough, extending into holes and cutouts along the edges of the cards to attach selected ones of the cards to the respective trays, an upper ratchet wheel and a lower wheel mounted on a vertical shaft within the base, a gear rod attached to each tray, each ratchet wheel mating with a pair of said gear rods at diametrically opposite points along the periphery of the wheel, and each rod being linearly movable to cause an identical linear movement in each of the remaining rods to move the trays and cards attached thereto by said pins simultaneously in a cruciform pattern.

10. The card extracting device claimed in claim 9 wherein the ratchet wheels are identical in diameter and concentrically disposed about the vertical shaft.

11. The card extracting device claimed in claim 9 wherein the ratchet wheels are free to rotate upon the shaft in both clockwise and counterclockwise directions.

12. A playing card dealing device for a deck of cards having a plurality of holes and cutouts selectively disposed about the edges, adapted to simultaneously deal four hands of playing cards from the deck in different directions, comprising a base including four arms arranged in cruciform fashion, a card carrying tray movable along each arm, a vertical wall having holes therethrough on each tray adapted to form an enclosure for the deck, at least one removable pin disposable through a selected hole in at least one wall and in vertical alignment with a preselected number of holes and cutouts, to secure selected ones of the cards to the vertical walls, said walls being adapted to move outward along the arms to thereby extract four separate hands simultaneously from the deck.

13. A card dealing device claimed in claim 12 wherein the cards dealt thereby contain the back surfaces divided into a multiplicity of colored rectangles, each rectangle bearing indicia according to color and number to indicate the correct sequence of playing the cards.

*14. Card distributing apparatus for separating cards selectively from a deck of cards each having coding means selectively disposed along a plurality of its edges, comprising: enclosure means providing a space for receiving said deck, said space having a plurality of edges corresponding to each of the respective edges of the deck, a plurality of card selector means, each reciprocable relative to said space in a direction normal to a respective edge of said space into coincidence with at least respective non-parallel edges of said space to form said enclosure means therearound, for cooperation with the coding means along a corresponding edge of said cards to separate particular cards from said deck in a plurality of different directions corresponding to the directions of reciprocation of said card selector means.*

*15. Card distributing apparatus as recited in claim 14, further comprising operating means for reciprocating said plurality of card selector means simultaneously to separate said particular cards simultaneously in said plurality of different directions.*

*16. Card distributing apparatus as recited in claim 14, wherein said coding means comprises holes and cutouts disposed selectively along said edges of said cards at substantially equispaced locations and wherein said card selector means comprises an arm adapted to overhang said coding means and a plurality of holes through said arm, each hole corresponding to a respective one of said locations and being in alignment with its corresponding location when said arm overhangs said coding means for guiding a pin into a hole or cutout of said coding means at a selected one of said locations.*

*17. A card separating device for separating certain cards from a stack of cards, comprising: a base, enclosure means providing a space for receiving said stack, said space having a plurality of edges corresponding to each of the respective edges of said stack, a plurality of card carrying means movable on said base relative to said space into coincidence with at least respective one-parallel edges of said space to form said enclosure means therearound, said cards having holes and cutouts selectively disposed about the edges thereof, said card carrying means having holes therethrough, and pins adapted to be removably placed through a hole in each of said carrying means and through selected holes and cutouts in the cards to extract said certain of said cards in one or more directions upon movement of said card carrying means from said space.*

*18. A card separating device for separating certain cards from a deck of cards, comprising: a base, enclosure means providing a space receiving said deck, said space having a plurality of edges corresponding to each of the respective edges of said deck, a plurality of card carrying means movable on said base relative to said space coincidence with at least respective non-parallel edges of said space to form said enclosure means therearound, said cards having holes and cutouts selectively disposed about the edges thereof, said holes and cutouts of each card being in substantial vertical alignment with corresponding holes and cutouts of the other cards of said deck, said card carrying means having holes therethrough, and a pin adapted to be removably placed through a hole in each of said carrying means and through selected holes and cutouts in the cards to draw said certain of said cards from said deck, said card carrying means being movable outwardly to pull therewith the cards secured thereto by their respective pins.*

*19. In combination with a card separating device for separating certain cards from a stack of cards having a base and a plurality of card carrying means movable on said base relative to said stack in engagement with at least respective non-parallel edges of said stack to form an enclosure therearound, a plurality of cards forming said stack and having a plurality of holes and cutouts selectively disposed about the edges thereof, said card carrying means having holes therethrough adapted to align with holes and cutouts of said cards so that disposing a pin through a selected hole in any of said card carrying means attaches selected cards thereto for extraction of said selected cards upon movement of said card carrying means from said stack.*

*20. In combination with a card separating device for separating certain cards from a stack of cards including a base and a plurality of card carrying means having holes therethrough and movable on said base relative to said stack into engagement with at least respective non-parallel edges of said stack to form an enclosure therearound, a plurality of cards forming said stack, each card having sequential playing indicia on the back thereof and a plurality of holes and cutouts selectively disposed along the edges thereof adapted to align with the holes in the card carrying means so that disposing pins through preselected holes in said card carrying means attaches preselected combinations of cards to said card carrying means for extraction from said stack upon movement of said card carrying means from said stack.*

*21. The card separating device claimed in claim 18 wherein said space is rectangular and the cards are moved simultaneously outward therefrom in a cruciform pattern.*

References Cited

The following references, cited by the Examiner, are of record in the patented file of this patent or the original patent.

UNITED STATES PATENTS

| | | | |
|---|---|---|---|
| 999,991 | 8/1911 | Hargrave | 209—110.5 |
| 2,296,113 | 9/1942 | Middlebrook | 273—152.2 |
| 2,313,285 | 3/1943 | Zalkind | 282—20 |

| | | | |
|---|---|---|---|
| 2,359,705 | 10/1944 | Zalkind | 209—110.5 |
| 2,544,251 | 3/1951 | Block | 209—110.5 |
| 2,588,286 | 3/1952 | Perwolf | 209—110.5 |
| 3,169,371 | 1/1965 | Parcher et al. | |

FOREIGN PATENTS

| | | | |
|---|---|---|---|
| 1,325,858 | 3/1963 | France | 273—149(P) |
| 1,139,098 | 11/1962 | Germany | 273—149(P) |

ANTON O. OECHSLE, Primary Examiner

U.S. Cl. X.R.

209—110.5; 273—152.1, 152.2